(No Model.)
D. BROOKS. Jr.
Underground Telegraph.
No. 235,502.   Patented Dec. 14, 1880.
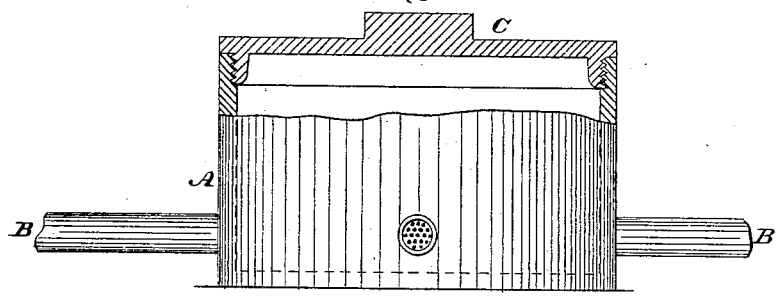
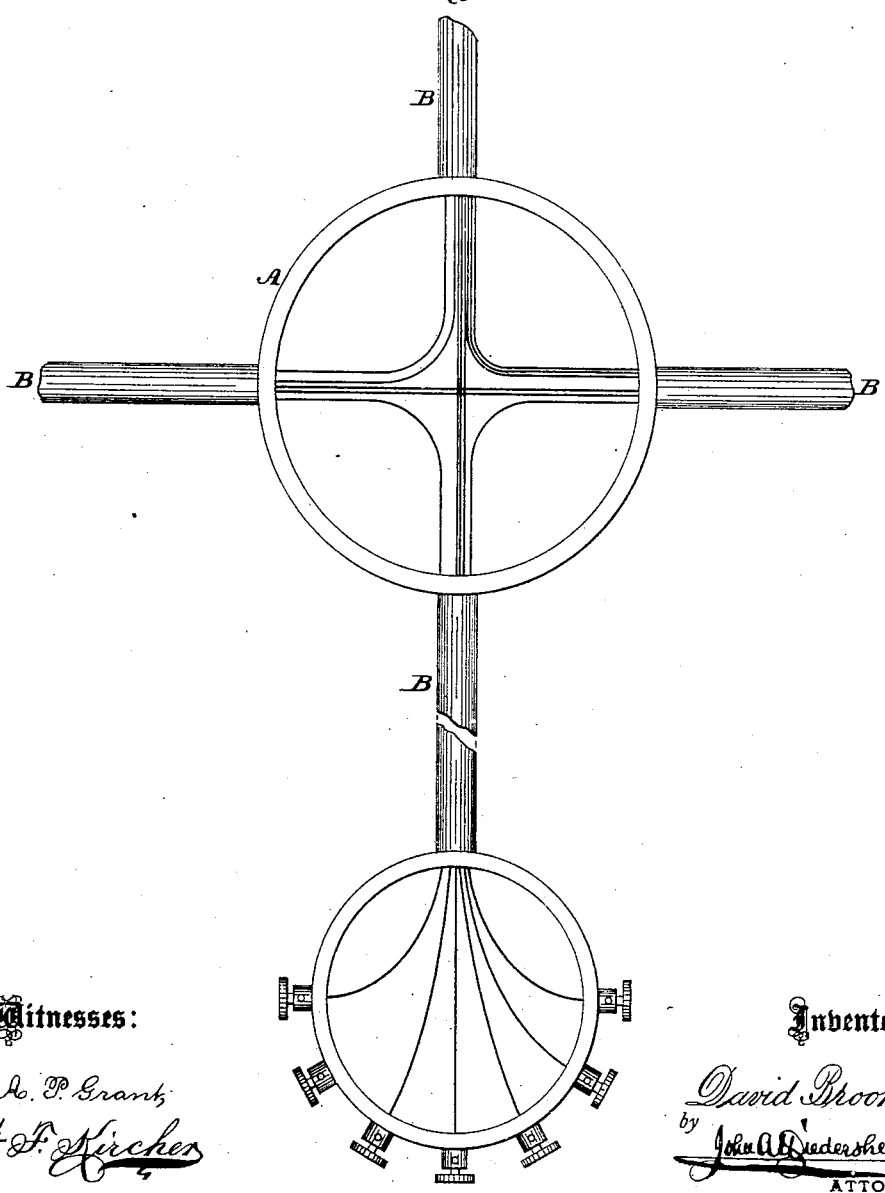
Witnesses:
A. P. Grant,
H. F. Kircher
Inventor:
David Brooks Jr.,
by John A. Wiedersheim
ATTORNEY.

UNITED STATES PATENT OFFICE.

DAVID BROOKS, JR., OF PHILADELPHIA, PENNSYLVANIA.

UNDERGROUND-TELEGRAPH.

SPECIFICATION forming part of Letters Patent No. 235,502, dated December 14, 1880.

Application filed June 2, 1880. (No model.)

*To all whom it may concern:*

Be it known that I, DAVID BROOKS, Jr., a citizen of the United States, residing in the city and county of Philadelphia, and State of Pennsylvania, have invented a new and useful Improvement in Insulators and Splice-Boxes for Telegraph and other Wires; and I do hereby declare the following to be a clear and exact description of the same, reference being had to the accompanying drawings, making part of this specification, in which—

Figure 1 is a side elevation, and Fig. 2 a top or plan view.

My invention consists of a method of and means for reliably insulating cables, telephone, telegraph, and other wires, and conveniently laying and distributing the same.

I take wires covered with cotton or tissue, and bunch a number of them to form a cable, which is then covered with lead, lead composition with tin lining, or other flexible or pliable substance, forming a sheath, which, with its inclosed cable, is forced through apertures or dies of successively smaller diameters until the sheath or covering is so reduced in diameter that the cable occupies almost all of the entire inner diameter of said sheath or covering, after which the sheath is coiled on a drum and assumes the form of a bobbin, and subjected to a heating process for the purpose of expelling the moisture existing in the cable, which operation is assisted by forcing air through the sheath, there being sufficient space within the sheath to permit the passage of the moisture and air therethrough. Petroleum-oil or other proper insulating-fluid is then directed into the sheath so as to completely envelop the cable, after which the oil is withdrawn from the cable and a composition of petroleum-oil and rosin is introduced in a melted or heated condition.

It will be found that rosin holds the oil and prevents leakage or evaporation thereof. It remains in a plastic condition at all temperatures below 200° Fahrenheit. It is non-porous and does not permit moisture or air to enter the cable.

In order to thicken the compound of petroleum-oil and rosin I apply thereto a sufficient quantity of marble-dust, sand, or other suitable material of a non-fusible nature, so that heat will not affect the plastic condition of the insulating substance and cause it to run.

When more than one coil is required, the requisite number may be spliced together after the manner of gutta-percha cables, and the joints between two of them, after being heated, are covered by a sleeve or coupling—say of lead—soldered in position to make a firm and air-tight connection.

The pipe or sheathing is formed of lead, which, when fused, is flowed by proper appliances over the length of the cable, so as to cover the same.

In laying the wires I employ splice-boxes A, at terminal and intermediate places, consisting of boxes, preferably metal, to which the pipes or sheaths B of the wires are secured. Openings are made in the boxes, so as to form communications between the pipes or sheaths and the interior of the boxes, whereby the cables may be run into the boxes and the wires distributed in various directions.

A screw-cap, C, is fitted to the top of each box and made air and water tight by means of packing, shellac, or other suitable material applied to the threads or joints of the caps and boxes.

Access is had to the wires in the boxes by removal of the caps C; and, if desired, the boxes may contain insulating-fluid, into which the wires dip.

Having thus described my invention, what I claim as new, and desire to secure by Letters Patent, is—

1. The process of insulating wires, consisting in treating the wires, in coils of lead pipe or a sheath, with liquid oil, then withdrawing the oil and introducing rosin and petroleum-oil, substantially as and for the purpose set forth.

2. An insulating substance or compound for cotton or tissue covered wires, consisting of petroleum-oil mixed with rosin, substantially as and for the purpose set forth.

3. Petroleum-oil, rosin, and a non-fusible thickener, forming an insulating substance.

DAVID BROOKS, JR.

Witnesses:
JOHN A. WIEDERSHEIM,
A. P. GRANT.